(12) United States Patent
Wan (10) Patent No.: US 9,203,266 B2
(45) Date of Patent: Dec. 1, 2015

(54) UPS SYSTEM AND METHOD OF SUPPLYING POWER TO NON-LINEAR LOAD

(75) Inventor: Xuewei Wan, Shenzhen (CN)

(73) Assignee: Liebert Corporation, Columbus, OH (US)

( * ) Notice: Subject to any disclaimer, the term of this patent is extended or adjusted under 35 U.S.C. 154(b) by 744 days.

(21) Appl. No.: 13/537,281

(22) Filed: Jun. 29, 2012

(65) Prior Publication Data

US 2013/0002025 A1    Jan. 3, 2013

(30) Foreign Application Priority Data

Jun. 29, 2011    (CN) .......................... 2011 1 0178887

(51) Int. Cl.
| H02J 9/00 | (2006.01) |
| H02J 9/06 | (2006.01) |
| H02J 3/01 | (2006.01) |
| H02J 3/18 | (2006.01) |

(52) U.S. Cl.
CPC . *H02J 9/062* (2013.01); *H02J 3/01* (2013.01); *H02J 3/1814* (2013.01); *Y02E 40/18* (2013.01); *Y02E 40/40* (2013.01); *Y10T 307/615* (2015.04)

(58) Field of Classification Search
CPC .......................................................... H02J 9/00
USPC ....................................................... 307/64–66
See application file for complete search history.

(56) References Cited

U.S. PATENT DOCUMENTS

| 6,295,215 B1* | 9/2001 | Faria et al. ....................... 363/37 |
| 2003/0062774 A1 | 4/2003 | Escobar et al. |
| 2005/0286274 A1* | 12/2005 | Pfitzer et al. ................... 363/37 |

FOREIGN PATENT DOCUMENTS

| CN | 101494389 A | 7/2009 |
| WO | WO-2009004150 A1 | 1/2009 |

OTHER PUBLICATIONS

Extended European Search Report regarding Application No. 12174349.6-2210, dated Nov. 2, 2011.
Sergio August Oliveira da Silva et al. "A Three-Phase Series-Parallel Compensated Line-Interactive UPS System with Sinusoidal Input Current and Sinusoidal Output Voltage." Conference Record of the 1999 IEEE Industry Applications Conference. Thirty-fourth IAS Annual Meeting. IEEE. Piscataway, New Jersey. vol. 2, Oct. 3, 1999. pp. 826-832.
First Chinese Office Action regarding Application No. 201110178887.X, dated Feb. 28, 2014. Partial translation provided by Unitalen Attorneys at Law.

* cited by examiner

*Primary Examiner* — Adi Amrany
(74) *Attorney, Agent, or Firm* — Harness, Dickey & Pierce, P.L.C.

(57) ABSTRACT

An UPS system and a method of supplying power to a non-linear load are provided. The UPS system may include a bypass module configured to supply a fundamental wave current to a non-linear load of the UPS system; and a power module configured to supply a harmonic current to the non-linear load when the bypass module operates normally.

12 Claims, 5 Drawing Sheets

UPS SYSTEM AND METHOD OF SUPPLYING POWER TO NON-LINEAR LOAD

CROSS REFERENCE TO RELATED APPLICATIONS

This application claims the benefit of Chinese patent application No. 201110178887.X, entitled "UPS System and Method of Supplying Power to Non-linear Load in ECO Mode", filed on Jun. 29, 2011 with State Intellectual Property Office, which is hereby incorporated by reference in its entirety.

FIELD

The present disclosure relates to electric and electronic technology, and in particular, to an Un-interrupted Power Supply (UPS) system and a method of supplying power to a non-linear load for the UPS system.

BACKGROUND

This section provides background information related to the present disclosure which is not necessarily prior art.

The Economy (ECO) mode of an Un-interrupted Power Supply (UPS) system is a power saving mode which is suitable for the current low-carbon, green, and energy-saving concepts. In ECO mode, when the bypass module operates to supply power to the load, the UPS supplies power to the load via a bypass module in the UPS, while an inverter of the UPS stands by. In the conventional ECO mode, the inverter is in a stand-by mode for a long time, since the UPS switches to an inverter supplying mode only when the bypass is turned off or operates abnormally. In such a case, if the load of the UPS is a non-linear load, the bypass module may generate harmonics when supplying power, which may pollute the grid and even cause a local grid abnormality.

SUMMARY

This section provides a general summary of the present disclosure, and is not a comprehensive disclosure of its full scope or all of its features.

Some embodiments of the disclosure provide an un-interrupted power supply (UPS) system which may avoid the generating of harmonics when supplying power to a non-linear load and thus avoid polluting of the grid.

According to an aspect of the disclosure, there is provided an UPS system, the UPS system may include: a bypass module configured to supply a fundamental wave current to a non-linear load of the UPS system; and a power module configured to supply a harmonic current to the non-linear load when the bypass module is supplying a fundamental wave current to a non-linear load.

According to another aspect of the disclosure, there is provided a method of supplying power to a non-linear load in an un-interrupted power supply (UPS) system. The UPS system may include a bypass module and a power module. The method may include: supplying a fundamental wave current to a non-linear load of the UPS system by the bypass module; and supplying a harmonic current to the non-linear load by the power module when the bypass module is supplying a fundamental wave current to a non-linear load.

In some embodiments of the disclosure, in the ECO mode of the UPS system, when the bypass module operates to supply power to the non-linear load, the bypass module and the at least one power module both supply power to the non-linear load. The bypass module supplies a fundamental wave current to the non-linear load and the power module supplies a harmonic current to the non-linear load. In this way, no harmonics are generated in the non-linear load with respect to the grid, and the pollution of the grid due to the harmonics may be avoided.

BRIEF DESCRIPTION OF THE DRAWINGS

The drawings described herein are for illustrative purposes only of selected embodiments and not all possible implementations, and are not intended to limit the scope of the present disclosure. In the drawings.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION

Examples of the disclosure will now be described more fully with reference to the accompanying drawings. The following description is merely exemplary in nature and is not intended to limit the present disclosure, application, or uses.

Example embodiments are provided so that the disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
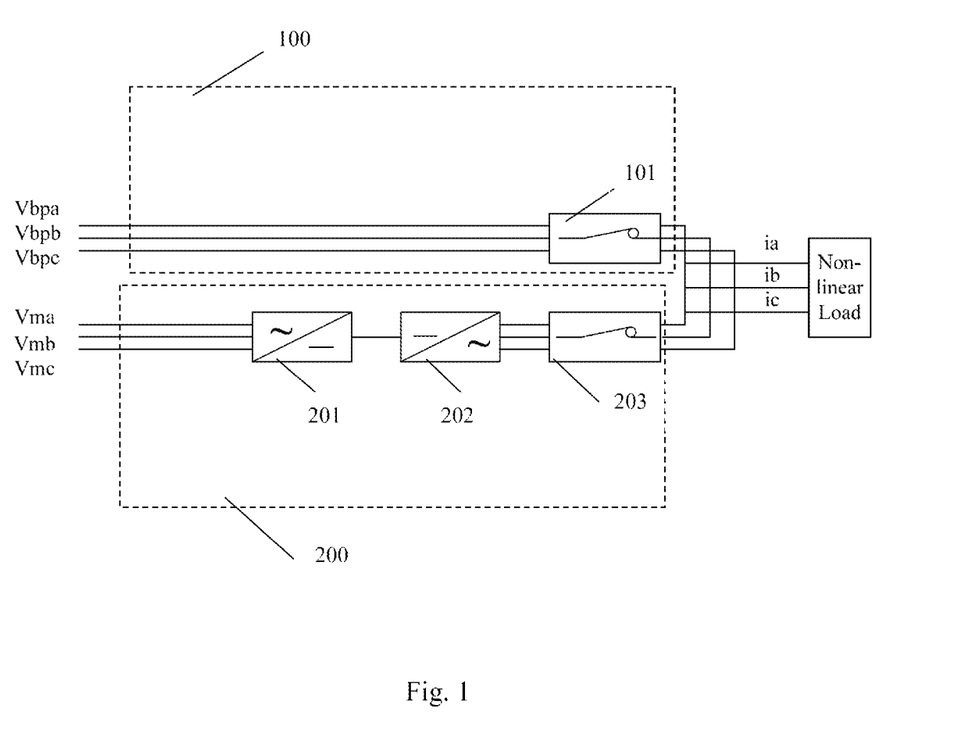
FIG. 1 is a schematic logic diagram showing an UPS system according to a first embodiment of the disclosure.

As shown in FIG. 1, the UPS system according to the first embodiment of the disclosure includes a bypass module 100 and a power module 200. The bypass module 100 includes a bypass switch 101 configured to activate or deactivate the bypass of the UPS. The power module 200 includes a rectifier 201, an inverter 202 and an inverter switch 203 which are connected in series in order. The inverter switch 203 is configured to activate or deactivate the power module. When the bypass switch 101 in the bypass module 100 is closed for the bypass module to supply power to the load, both of the bypass module 100 and the power module supply power to the non-linear load. That is, the bypass switch 101 in the bypass module 100 and the inverter switch 203 in the power module 200 both are switched on at this time. The bypass module 100 is powered by three-phase input voltages $V_{bpa}$, $V_{bpb}$ and $V_{bpc}$, and the power module 200 is powered by three-phase input voltages $V_{ma}$, $V_{mb}$ and $V_{mc}$, so that the bypass module 100 and the power module both can supply power to the non-linear load. In addition, the bypass module 100 provides a fundamental wave current to the non-linear load and the power module 200 provides a harmonic current to the non-linear load. The fundamental wave current provided by the bypass module 100 and the harmonic current provided by the power module 200 are added, as the current provided to the non-linear load. At this time, in the UPS system which is currently in a bypass mode, the rectifier 201 needs only a small fundamental wave current to maintain the stability of the bus voltage in the UPS, and the inverter 202 operates in a current supply mode. In the embodiment, when the bypass switch in the bypass module is closed for the bypass module to supply power to the load in the ECO mode of the UPS system, since both of the bypass module and the power module of the UPS system supply power to the non-linear load, where the bypass module provides the fundamental wave current and the power module provides the harmonic current so that the fundamental wave current and the harmonic current are added as the current provided to the non-linear load, no harmonics are generated in the non-linear load with respect to the grid and thus no pollution is made to the grid.

In some embodiments, the UPS system may optionally include a first control board and at least one second control board. The first control board may be configured to calculate the harmonic currents in the current of each phase; and the second control board may be configured to control the corresponding inverter switch according to the calculated harmonic currents in the current of each phase so that the inverter outputs corresponding harmonic current. In this way, at least one power module can provide harmonic currents to the non-linear load.

Figure 2:
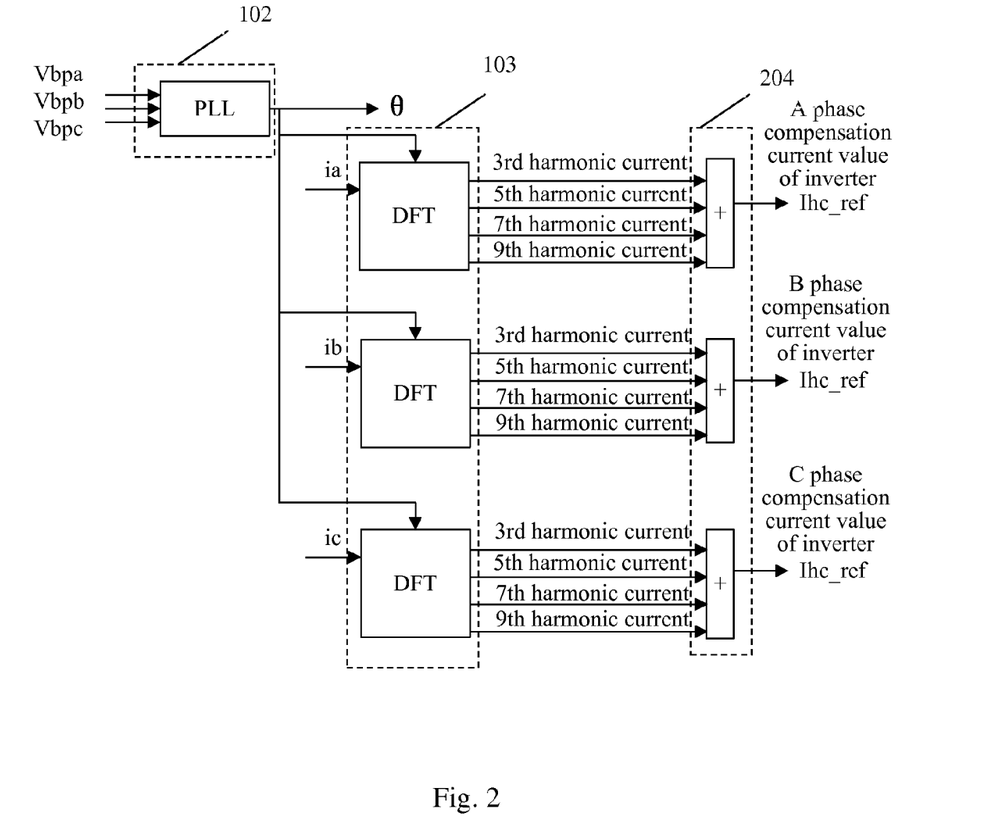
FIG. 2 is a schematic logic diagram showing a part of an UPS system according to a second embodiment of the disclosure.

FIG. 2 is a schematic logic diagram illustrating an UPS system according to the second embodiment of the disclosure. In addition to the bypass switch 101 in the bypass module 100 and the rectifier 201, the inverter 202 and the inverter switch 203 in the power module 200 as shown in FIG. 1, the UPS system shown in FIG. 2 may further include a current sensor (not shown) arranged on each phase of an output power line (i.e. 3 current sensors, each of which corresponds to one of the 3 phases of the output power line), a phase locked loop (PLL) 102, Fourier transformation units (DFTs) 103, an adder circuit 204 and an adjuster (not shown). The current sensor arranged on the output power line is configured to detect a current of each of the 3 phases of the load. The adjuster is connected to the inverter and is configured to control the switch of the inverter. Each current sensor may be a current transformer or a Hall element. The PLL 102 and the Fourier transformation units 103 may be arranged on the first control board and the adder circuit 204 and the adjuster may be arranged on the second control board. Optionally the first control board may be provided in the bypass module and the second control board may be provided in the power module. It should be noted that this is merely an example of the disclosure. The disclosure should not be limited to this example. For example, the first and second control boards both may be provided in the power module. In the UPS system, the PLL 102 may be used to calculate the phase angle θ of the fundamental wave of the bypass input voltages $V_{bpa}$, $V_{bpb}$ and $V_{bpc}$. Each Fourier transformation unit 103 is configured to calculate the harmonic currents in output current of each phase based on the phase angle θ calculated by the PLL 102 and currents of the 3 phases of the load, i.e. ia, ib and, is as shown, detected by the current sensors. In the embodiment, only the $3^{rd}$, $5^{th}$, $7^{th}$ and $9^{th}$ harmonic currents in the load current of each phase may be calculated. However, it should be noted that the present disclosure should not be limited to calculating these harmonic currents. For example, higher-rank or lower-rank harmonic currents may be further calculated based on the precision of harmonic compensation and the capability of the device. The adder circuit 204 is configured to add the harmonic currents in output current of each phase, respectively, to obtain the total harmonic current of each phase. The adjuster is configured to control the switch of the inverter 202 based on the total harmonic currents of each of the 3 phases, so as to make the inverter to output corresponding harmonic current.

Figure 3:
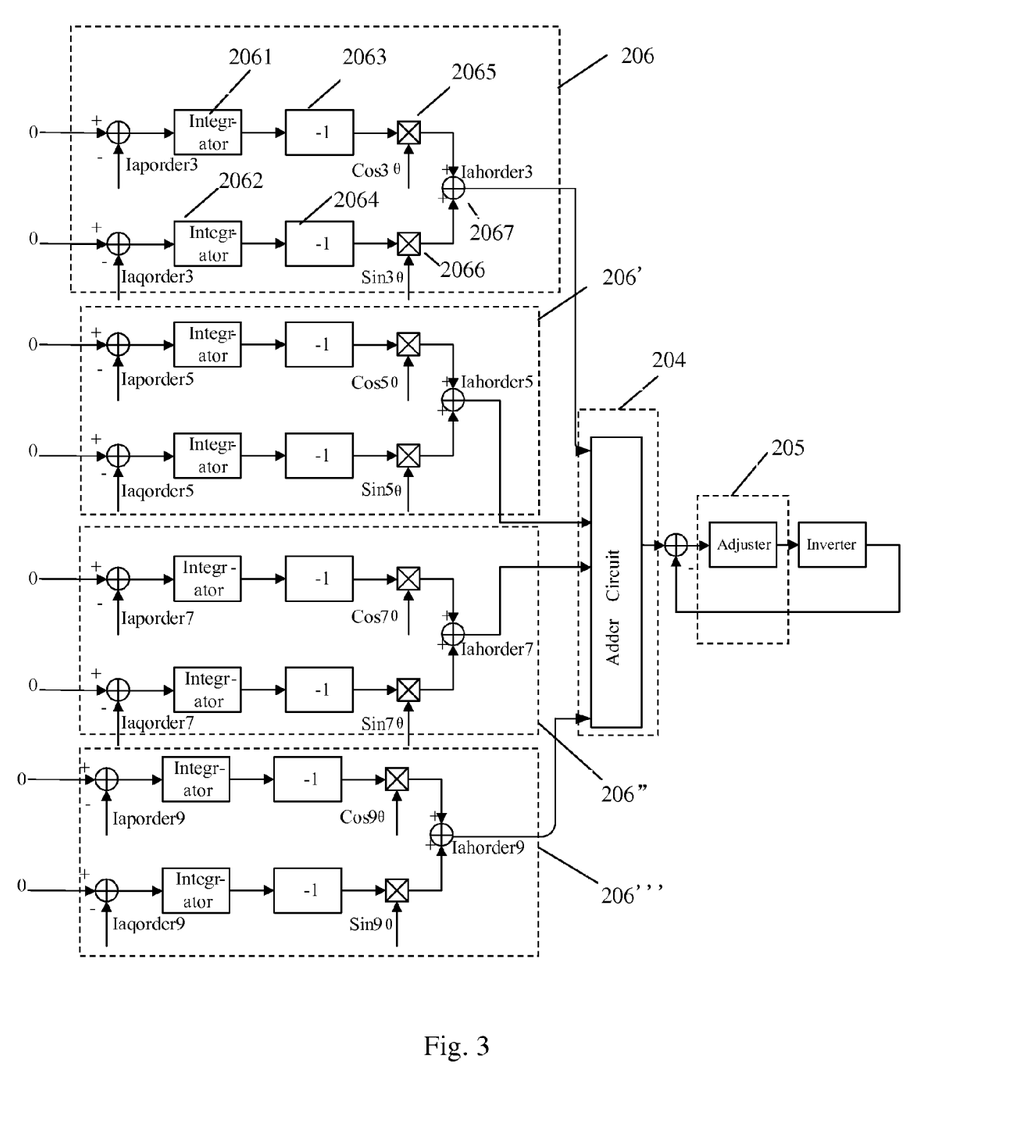
FIG. 3 is a schematic logic diagram showing a part of an UPS system according to a third embodiment of the disclosure.

FIG. 3 is a schematic logic diagram showing a part of an UPS system according to a third embodiment of the disclosure. In addition to the bypass switch 101, the rectifier 201, the inverter 202 and the inverter switch 203 as shown in FIG. 1, the UPS system shown in FIG. 3 may further include a current sensor (not shown) arranged on each phase of a bypass power line (i.e. 3 current sensors, each of which corresponds to one of the 3 phases of the bypass power line); a PLL which is not shown in FIG. 3 and is the same as the PLL 102 shown in FIG. 2; Fourier transformation units which are not shown in FIG. 3 and are the same as the DFTs 103 shown in FIG. 2; a plurality of no-error adjusting units 206, 206', 206" and 206'''; an adder circuit 204 and an adjuster 205. Each no-error adjusting unit corresponds to one-rank harmonics of one of the 3 phases. Different from the embodiment shown in FIG. 2, the current sensor in the third embodiment is arranged on each phase of the bypass power line of the UPS system and is configured to detect a current of each phase of 3-phases in the by-phase. Moreover, the adjusting performed in the embodiment of FIG. 2 is an open-loop adjusting, while in the third embodiment the adjusting is a close-loop adjusting where a plurality of the no-error adjusting units (which are detailed below) are provided. The following is a description of the difference between the open-loop adjusting and the close-loop adjusting. For example, it is assumed that the current needed by the load is 10 A. In the second embodiment shown in FIG. 2, since the current sensor is arranged on each phase of the output power line, what is detected by the current sensor are the current of each phase of the 3 phases of the load, that is, a load current of 10 A of each phase. The open-loop adjusting shown in FIG. 2 is performed based on the detected load current of 10 A of each phase. After the open-loop adjusting, the inverter in the power module outputs a current of 10 A which meets the requirement of the load. In contrast, in the third embodiment shown in FIG. 3 under the same assumption that the current needed by the load is 10 A, since the current sensor is arranged on each phase of the bypass power line, what is detected by the current sensor is the currents of each of the 3 phases of the bypass, i.e. the bypass current of each phase. Assuming the detected bypass current of each phase is 5 A, the current value needed to be output by the power module is then 10 A−5 A=5 A. The close-loop adjusting shown in FIG. 3 is performed based on the detected bypass current of 5 A. After the close-loop adjusting, the inverter in the power module outputs a current of 5 A, which also meets the requirement of the load. As can be seen, since in the two embodiments the current sensors are provided in different locations, the adjusting processes performed in the two embodiments are different from each other.

Each current sensor may be a current transformer or a Hall element. The PLL and the Fourier transformation units may be arranged on the first control board. The plurality of no-error adjusting units 206, 206', 206" and 206''', the adder circuit 204 and the adjuster 205 may be arranged on the second control board. Optionally the first control board may be provided in the bypass module and the second control board may be provided in the power module. It should be noted that this is merely an example of the disclosure. The disclosure should not be limited to this example. For example, the first and second control boards both may be provided in the power module. In addition, FIG. 3 shows only the compensation schemes for the $3^{rd}$, $5^{th}$, $7^{th}$ and $9^{th}$ harmonics of one of the 3 phases, where the no-error adjusting unit 206 is configured to calculate the instantaneous value of the $3^{rd}$ harmonic current of the phase to be compensated, the no-error adjusting unit 206' is configured to calculate the instantaneous value of the $5^{th}$ harmonic current of the phase to be compensated, the no-error adjusting unit 206" is configured to calculate the instantaneous value of the $7^{th}$ harmonic current of the phase to be compensated, and the no-error adjusting unit 206''' is configured to calculate the instantaneous value of the $9^{th}$ harmonic current of the phase to be compensated. It should be noted that the compensation schemes for the $3^{rd}$, $5^{th}$, $7^{th}$ and $9^{th}$ harmonics of the other two of the 3 phases are similar to that shown in the Figure, the description of which is omitted here. In the UPS system, the PLL may be used to calculate the phase angle of the fundamental wave of the bypass input voltages. The Fourier transformation units are configured to calculate the harmonic components of each phase output current based on the phase angle calculated by the PLL and the currents of 3 phases detected by the current sensors. Each rank harmonic components contains an active component amplitude value Iaporderx(x=3,5,7,9), a reactive component amplitude value Iaqorderx(x=3,5,7,9), an active component phase cos(xθ)(x=3,5,7,9), and a reactive component phase sin(xθ)(x=3,5,7,9). The logic structure of the no-error adjusting unit is described below, taking the no-error adjusting unit 206 as an example. It should be noted that the other no-error adjusting units 206', 206" and 206''' are the same with the no-error adjusting unit 206 and are not repeatedly described. The no-error adjusting unit 206 includes an active amplitude value integrator 2061, a reactive amplitude value integrator 2062, a first phase inverter 2063, a second phase inverter 2064, a first multiplier 2065, a second multiplier 2066 and an adder 2067. A given terminal of the active amplitude value integrator 2061 is set as "0", a feedback terminal of the active amplitude value integrator 2061 receives the active harmonic component amplitude "Iaporder3" calculated by the Fourier transformation unit, and an output terminal of the active amplitude value integrator 2061 is connected to the input terminal of the first phase inverter 2063. The output terminal of the first phase inverter 2063 is connected to the first input terminal of the first multiplier 2065. The second input terminal of the first multiplier 2065 receives the active component phase cos 3θ calculated by the Fourier transformation unit. A given terminal of the reactive amplitude value integrator 2062 is set as "0", a feedback terminal of the reactive amplitude value integrator 2062 receives the reactive harmonic component amplitude "Iaqorder3" calculated by the Fourier transformation unit, and an output terminal of the reactive amplitude value integrator 2062 is connected to the input terminal of the second phase inverter 2064. The output terminal of the second phase inverter 2064 is connected to the first input terminal of the second multiplier 2066. The second input terminal of the second multiplier 2066 receives the reactive component phase sin 3θ calculated by the Fourier transformation unit. The two input terminals of the adder 2067 are connected to the output terminal of the first multiplier 2065 and the output terminal of the second multiplier 2066, respectively. The adder 2067 outputs an instantaneous value "Iahorder3" of the $3^{rd}$ harmonic current of the phase to be compensated. In this way, the no-error adjusting unit 206 obtains the instantaneous value "Iahorder3" of the $3^{rd}$ harmonic current of the phase. Likewise, the no-error adjusting units 206', 206" and 206''' may obtain the instantaneous values "Iahorder5", "Iahorder7" and "Iahorder9" of the $5^{th}$, $7^{th}$ and $9^{th}$ harmonic currents of the phase to be compensated. Then the adder circuit 204 adds the instantaneous values "Iahorder3", "Iahorder5", "Iahorder7" and "Iahorder9" of these harmonic currents of the phase respectively outputted by the no-error adjusting units 206, 206', 206" and 206'''. The adjuster 205 controls the switch of the inverter based on the sum of the instantaneous values of the harmonic currents of each phase, so as to cause the inverter to output corresponding harmonic current. In this embodiment, an active amplitude value integrator and a reactive amplitude value integrator are introduced for the active components and the reactive components of the harmonic currents of each rank in each phase. Compared with the embodiment shown in FIG. 2, the UPS system shown in FIG. 3 may achieve a more precise no-error compensation filtering.

Figure 4:
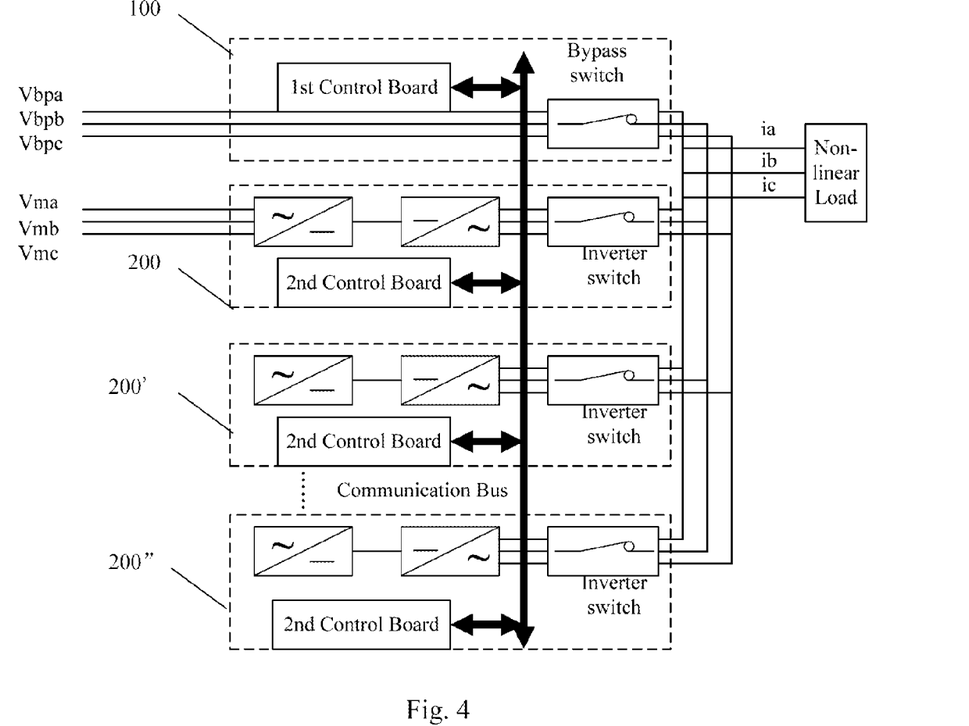
FIG. 4 is a schematic logic diagram showing an UPS system according to a fourth embodiment of the disclosure.

In the above embodiments the UPS system is shown as having one power module. In some other embodiments, the UPS may include two or more power modules which supply harmonic currents to the non-linear load at the same time. That is, the power modules each share the supplying of the harmonic currents to the non-linear load. For example, as shown in FIG. 4, the UPS system may include a bypass module 100 and 3 power modules 200, 200' and 200". In this embodiment, the first control board is provided in the bypass module, and each power module corresponds to a second control board. The first control board in which the bypass module is provided is connected to the second control boards corresponding to the power modules 200, 200' and 200" via a communication bus. The UPS system includes a plurality of power modules, and may include a plurality of no-error adjusting units shown in FIG. 3. Taking the no-error adjusting unit 206 as an example, in this embodiment the feedback terminal of the active amplitude value integrator 2061 receives the quotient of the active component amplitude "Iaporder3" of the $3^{rd}$ harmonic divided by the number of the power modules (3 power modules as shown in FIG. 4), i.e. (Iaporder3)/3, instead of the active component amplitude "Iaporder3" of the $3^{rd}$ harmonic Likewise, the feedback terminal of the reactive amplitude value integrator 2062 receives the quotient of the reactive component amplitude "Iagorder3" of the $3^{rd}$ harmonic divided by the number of the power modules (3 power modules as shown in FIG. 4), i.e. (Iaporder3)/3, instead of the reactive component amplitude "Iagorder3" of the $3^{rd}$ harmonic. The other elements in the no-error adjusting unit 206 are the same with those shown in FIG. 3, the description of which is not repeated.

In a method of supplying power to the non-linear load in the UPS according to the first embodiment, when the bypass switch in the bypass module is closed for the bypass module to supply power to the load, the bypass module and at least one power module supply power to the non-linear load at the same time. The bypass module supplies a fundamental wave current to the non-linear load and the power module supplies harmonic currents to the non-linear load.

Figure 5:
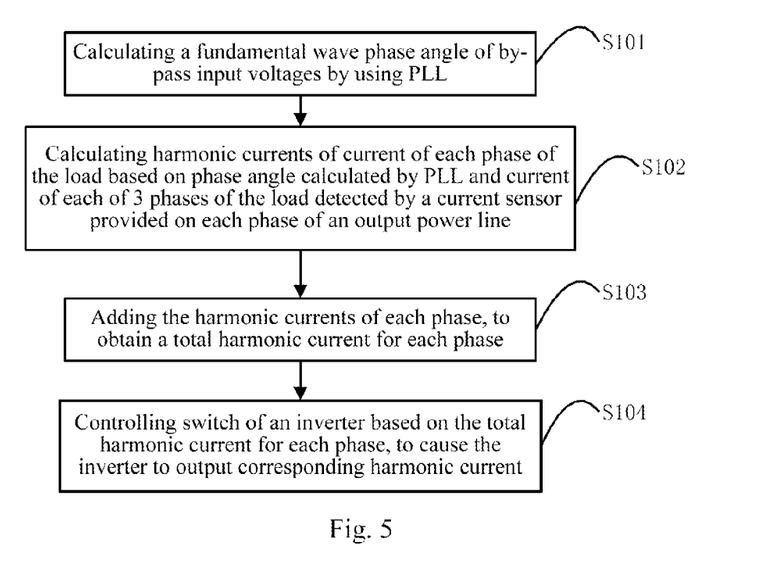
FIG. 5 is a schematic flow chart showing a method of supplying power to a non-linear load in ECO mode in an UPS system according to the second embodiment of the disclosure.

As shown in FIG. 5, in a method of supplying power to the non-linear load in ECO mode in the UPS according to the second embodiment, when the bypass switch in the bypass module is closed for the bypass module to supply power to the load, the bypass module and at least one power module supply power to the non-linear load at the same time. The bypass module supplies a fundamental wave current to the non-linear load and the power module supplies harmonic currents to the non-linear load. In addition, with reference to FIG. 2, the process of supplying harmonic currents to the non-linear load by the at least one power module may include the following steps S101-S104.

In step S101, the fundamental wave phase angle of the bypass input voltages is calculated by using the phase locked loop (PLL). In step S102, the harmonic currents in the current of each phase of the load are calculated based on the phase angle calculated by the PLL and the current of each phase of the load detected by the current sensor provided on each phase of the output power line. In step S103, the harmonic currents of each of the 3 phases are added, to obtain a total harmonic current for each phase. In step S104, the switch of the inverter is controlled based on the total harmonic current for each phase, so as to cause the inverter to output corresponding harmonic current.

Figure 6:
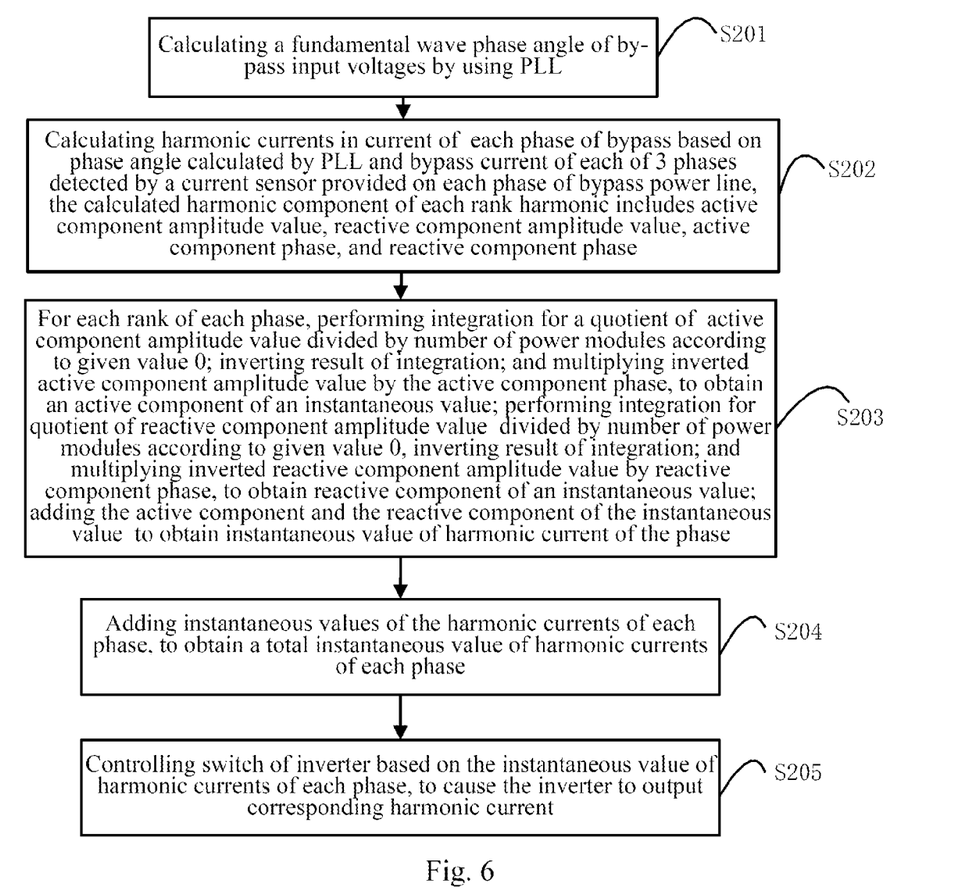
FIG. 6 is a schematic flow chart showing a method of supplying power to a non-linear load in ECO mode in an UPS system according to the third embodiment of the disclosure.

As shown in FIG. 6, in a method of supplying power to the non-linear load in ECO mode in the UPS according to the third embodiment, when the bypass switch in the bypass module is closed for the bypass module to supply power to the load, the bypass module and the power module supply power to the non-linear load at the same time. The bypass module supplies a fundamental wave current to the non-linear load and the power module supplies harmonic currents to the non-linear load. In addition, with reference to FIG. 3, the process of supplying harmonic currents to the non-linear load by a power module may include the following steps S201-S205.

In step S201, the fundamental wave phase angle of the bypass input voltages is calculated by using the phase locked loop (PLL). In step S202, the harmonic currents in the current of each phase of the load are calculated based on the phase angle calculated by the PLL and the current of each of the 3 phases of the load detected by the current sensor provided on each phase the bypass power line. The calculated harmonic component of each rank includes an active component amplitude value, a reactive component amplitude value, an active component phase and a reactive component phase. In step S203, for each rank harmonic of each phase, integration is performed for the quotient of the active component amplitude value of the corresponding rank harmonic current of the corresponding phase divided by the number of power modules according to a given value "0". The result of the integration is inverted. The inverted active component amplitude value of the corresponding harmonic current is then multiplied by the active component phase of the corresponding harmonic of the corresponding phase, to obtain an active component of an instantaneous value of the corresponding rank harmonic current of the corresponding phase. Integration is performed for the quotient of the reactive component amplitude value of the corresponding rank harmonic current of the corresponding phase divided by the number of power modules according to a given value "0". The result of the integration is inverted. The inverted reactive component amplitude value of the corresponding harmonic current is then multiplied by the reactive component phase of the corresponding harmonic of the corresponding phase, to obtain a reactive component of an instantaneous value of the corresponding rank harmonic current of the corresponding phase. Then the active component and the reactive component of the instantaneous value of the corresponding rank harmonic current of the corresponding phase are added, to obtain the instantaneous value of the corresponding rank harmonic current of the corresponding phase to be compensated. In step S205, the instantaneous values of the harmonic currents of each phase are added, to obtain the total instantaneous value of harmonic currents of each phase. In step S205, the switch of the inverter is controlled based on the instantaneous value of harmonic currents of each phase, so as to cause the inverter to output corresponding harmonic current.

It should be noted that, in the third embodiment shown in FIG. 6, when there is only one power module, the integration performed for the quotient of the active component amplitude value of the corresponding rank harmonic current of the corresponding phase divided by the number of power modules according to a given value "0" means the integration performed for the active component amplitude value of the corresponding rank harmonic current of the corresponding phase according to the given value "0", and the integration performed for the quotient of the reactive component amplitude value of the corresponding rank harmonic current of the corresponding phase divided by the number of power modules according to a given value "0" means the integration performed for the reactive component amplitude value of the corresponding rank harmonic current of the corresponding phase according to the given value "0".

Some preferred embodiments have been described above. It should be noted that the disclosure should not be construed as being limited to these particular embodiments. Those skilled in the art shall appreciate that various modifications and alterations can be made thereto without departing from the protection scope of the appended claims and their equivalents.

What is claimed is:

1. An un-interrupted power supply (UPS) system comprising:
   a bypass module configured to supply a fundamental wave current to a non-linear load of the UPS system; and a power module configured to supply a three-phase harmonic current to the non-linear load when the bypass module is supplying the fundamental wave current to the non-linear load, the power module comprising:
 a plurality of no-error adjusting units, each no-error adjusting unit corresponding to a rank harmonic of a phase and being configured to calculate an instantaneous value of the corresponding rank harmonic current of the corresponding phase to be compensated,
 a first control board comprising:
  an adder circuit configured to add the instantaneous values of harmonic currents of each phase to obtain a total instantaneous value of harmonic current for each phase; and
  an adjuster configured to control corresponding inverter switches according to the total instantaneous value of harmonic current for the phases, respectively, to cause the inverter to output corresponding harmonic current.

2. The UPS system of claim 1, wherein the power module comprises the inverter, and the UPS system further comprises:
 a second control board configured to calculate harmonic currents of each phase,
 wherein the first control board is configured to control the switching of the phases of the inverter according to the calculated harmonic currents of each phase to cause the inverter to output corresponding harmonic current.

3. The UPS system of claim 2, further comprising:
 a current sensor provided on each phase of an output power line of the UPS system and configured to detect a current of each phase of the load,
 wherein the second control board is configured to calculate the harmonic currents of each phase based on the current of each phase of the load detected by the current sensor.

4. The UPS system of claim 2, further comprising:
 a current sensor provided on each phase of a bypass power line of the UPS system and configured to detect a current of each phase of a bypass in the UPS system,
 wherein the second control board is configured to calculate the harmonic currents of each phase based on the current of each phase of the bypass detected by the current sensor.

5. The UPS system of claim 4, wherein
the second control board comprises:
 a phase locked loop configured to calculate a fundamental wave phase angle of bypass input voltages input into the bypass module; and
 Fourier transformation units configured to calculate harmonic currents in the current of each phase of the bypass according to the fundamental wave phase angle of the bypass input voltages calculated by the phase locked loop and the current of each phase of the bypass detected by the current sensor, each rank harmonic current component of the harmonic currents comprises an active component amplitude value, a reactive component amplitude value, an active component phase and a reactive component phase.

6. The UPS system of claim 5, wherein each no-error adjusting unit comprises:
 an active amplitude value integrator, an input terminal of the active amplitude value integrator being set as "0" and a feedback terminal of the active amplitude value integrator receiving a quotient of the active component amplitude value divided by number of power modules;
 a reactive amplitude value integrator, an input terminal of the reactive amplitude value integrator being set as "0" and a feedback terminal of the reactive amplitude value integrator receiving a quotient of the reactive component amplitude value divided by the number of power modules;
 a first phase inverter, an input terminal of the first phase inverter being connected to an output terminal of the active amplitude value integrator;
 a second phase inverter, an input terminal of the second phase inverter being connected to an output terminal of the reactive amplitude value integrator;
 a first multiplier, a first input terminal of the first multiplier being connected to an output terminal of the first phase inverter and a second input terminal of the first multiplier receiving the active component phase calculated by the Fourier transformation unit;
 a second multiplier, a first input terminal of the second multiplier being connected to an output terminal of the second phase inverter; and a second input terminal of the second multiplier receiving the reactive component phase calculated by the Fourier transformation unit; and
 an adder, two input terminals of the adder being connected to an output terminal of the first multiplier and an output terminal of the second multiplier, respectively, and the adder outputting the instantaneous value of the corresponding rank harmonic current of the corresponding phase to be compensated.

7. The UPS system of claim 2, wherein the second control board is provided in the bypass module and the first control board is provided in the corresponding power module.

8. The UPS system of claim 2, wherein the second control board and the first control board both are provided in the corresponding power module.

9. A method of supplying power to a non-linear load for an un-interrupted power supply (UPS) system comprising a bypass module and a power module, the method comprising:
 supplying a fundamental wave current to the non-linear load by the bypass module; and
 supplying a harmonic current to the non-linear load by the power module when the bypass module is supplying the fundamental wave current to the non-linear load;
 calculating instantaneous values of rank harmonic currents of phases by no-error adjusting units, respectively;
 calculating a total instantaneous value of harmonic currents of each phase; and
 controlling corresponding inverter switches based on the total instantaneous values of harmonic currents of the phases, respectively, to cause the inverter to output corresponding harmonic current.

10. The method of claim 9, wherein supplying a harmonic current to the non-linear load by the power module comprises:
 calculating harmonic currents of the phases, respectively; and
 controlling the corresponding inverter switches in the power module according to the calculated harmonic currents of the phases, respectively, to cause the inverter to output corresponding harmonic current.

11. The method of claim 10, wherein calculating harmonic currents of each phase comprises:
 calculating a fundamental wave phase angle of bypass input voltages by using a phase locked loop in the UPS system; and
 calculating harmonic currents in a current of each phase of the load based on the phase angle calculated by the phase locked loop and a current of each phase of the load detected by a current sensor provided on each phase of a bypass power line in the UPS system, each rank harmonic current component of the calculated harmonic currents comprising an active component amplitude value, a reactive component amplitude value, an active component phase, and a reactive component phase.

12. The method of claim 11, wherein calculating a total instantaneous value of harmonic currents of a phase comprises:

for each rank harmonic of the phase, performing integration for a quotient of the active component amplitude value of the corresponding rank harmonic of the phase divided by number of power modules in the UPS system according to a given value "0";

inverting a result of the integration; and multiplying the inverted active component amplitude value of the corresponding harmonic current by the active component phase of the corresponding harmonic of the phase, to obtain an active component of an instantaneous value of the corresponding rank harmonic current of the phase;

performing integration for a quotient of the reactive component amplitude value of the corresponding rank harmonic current of the phase divided by the number of power modules according to a given value "0", inverting a result of the integration; and multiplying the inverted reactive component amplitude value of the corresponding harmonic current by the reactive component phase of the harmonic of the corresponding phase, to obtain an reactive component of an instantaneous value of the corresponding rank harmonic current of the phase;

adding the active component and the reactive component of the instantaneous value of the corresponding rank harmonic current of the phase, to obtain the instantaneous value of the corresponding rank harmonic current of the phase to be compensated; and adding the instantaneous values of the harmonic currents of the phase, to obtain a total instantaneous value of harmonic currents of the phase.

* * * * *